Figure 1:
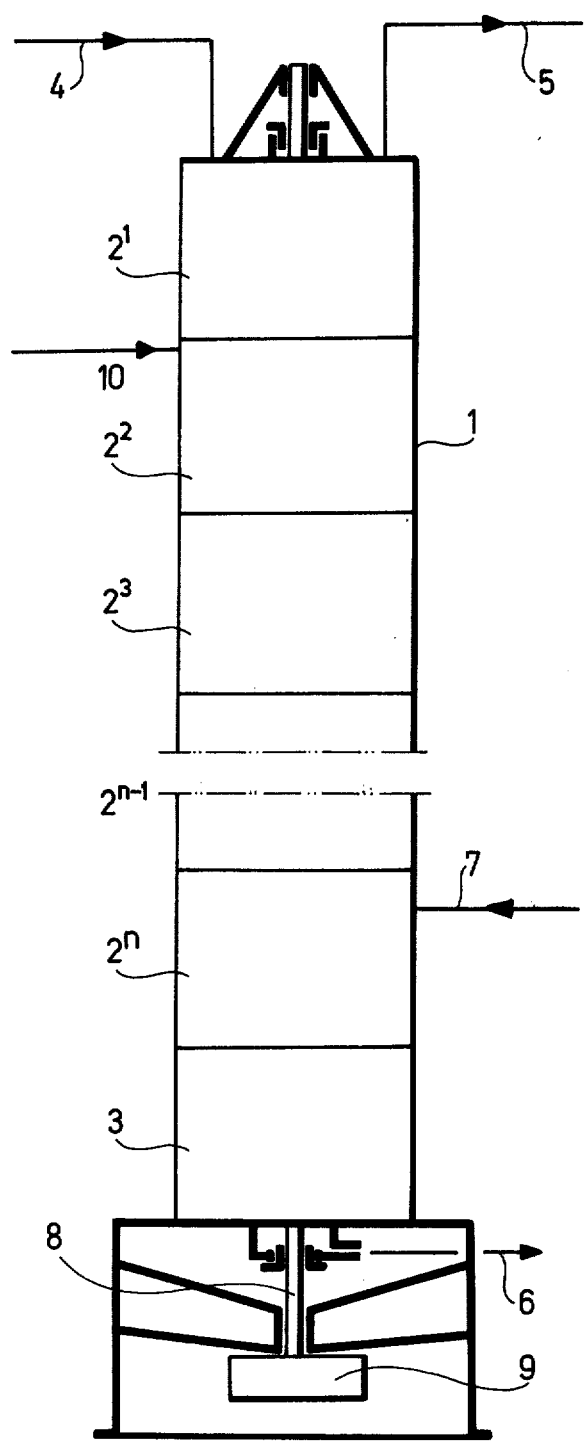

United States Patent [19]
Brieger et al.

[11] 3,881,875
[45] May 6, 1975

[54] EQUIPMENT FOR THE CONTINUOUS PRODUCTION OF SYNTHETIC RESINS FOR THE VARNISH INDUSTRY

[75] Inventors: Lajos Brieger, Tiszaszederkeny; Karoly Doktor, Leninvaros; Géza Székely, Budapest; Tibor Szénás, Miskolc; Gabriella Békefi, Budapest; Dezsö Zorányi, Miskolc, all of Hungary

[73] Assignee: Tiszai Vegyi Kombinat, Leninvaros, Hungary

[22] Filed: Aug. 27, 1973

[21] Appl. No.: 391,876

[52] U.S. Cl. .............. 23/283; 23/260; 23/263; 261/89; 261/91; 202/158; 260/13 R; 260/22; 260/24; 260/75 M; 260/861; 260/34.2
[51] Int. Cl. ................................. C08f 1/98
[58] Field of Search ........... 23/283, 260, 285, 252, 23/263; 261/83, 84, 89, 91; 202/158; 260/13 R, 22

[56] References Cited
UNITED STATES PATENTS
| | | | |
|---|---|---|---|
| 2,776,193 | 1/1957 | Habicht | 23/283 |
| 3,510,267 | 5/1970 | Dietze et al. | 23/285 |

Primary Examiner—James H. Tayman, Jr.
Attorney, Agent, or Firm—Young & Thompson

[57] ABSTRACT

Equipment for the continuous production of synthetic resins for the varnish industry, comprises a fixed upright cylindrical reactor having a plurality of superposed trays therein and a central vertical rotating shaft. Each tray has upstanding therefrom a cylindrical side wall, and radially inwardly of the cylindrical side wall a cylindrical dividing element of lesser height than the side wall, and radially inwardly of the dividing element a cylindrical overflow element of lesser height than the dividing element. Material overflowing the overflow element passes centrally downwardly to the next tray, where it lands on a spary disc that overlies a central portion of the tray so as to direct material to the space between the outer wall and the dividing element, the material then passing over the dividing element and over the overflow element in a circuitous radially inwardly progressing path, to the next tray down and so on. Mixers carried by the rotating shaft extend radially outwardly between the spray disc and the dividing element and have downwardly depending mixing blades on both sides of the dividing element. The beginning mixture enters the top of the cylindrical reactor and the product is removed from the bottom. Gas is introduced intermediate the height of the reactor and leaves through the top.

4 Claims, 4 Drawing Figures

EQUIPMENT FOR THE CONTINUOUS PRODUCTION OF SYNTHETIC RESINS FOR THE VARNISH INDUSTRY

The invention relates to apparatus for continuous production of synthetic resins for the varnish industry.

The invention provides continuously operating equipment for the production of synthetic resins for the varnish industry, which independently of the synthetic resin types to be produced, can be universally used, with the parallel or series carrying out of the synthetic resin forming reactions of different types, further the specific capacity of which is a multiple of that of intermittently operating equipment and the macromolecular distribution of the obtained end product is more homogeneous, optimum-definable, reproducible and finally, the operation is inexpensive.

This task is performed according to the invention so that the fixed cylinder reactor of the equipment has "$n$" intermediate trays communicating with each other, provided with heating and temperature regulating elements and the said trays are closed at the bottom by a lower tray developed as a hydraulic seal and recooling zone, the single trays are connected to each other by means of apparatus flanges provided with seals; the temperatures of the single trays and the flow of the material conducted through the reactor in counterflow are chosen as a function of the type and reaction time of the synthetic resin forming reactions; the uppermost intermediate tray of the reactor has a conduit introducing the homogenized reaction components and a gas discharge conduit, whereas its lower tray has a conduit discharging the prepared resin, a gas and liquid inlet conduit; and the reactor has a main shaft developed along its total height and provided with mixing elements.

In a highly expedient embodiment of the equipment according to the invention the uppermost arranged intermediate tray of the reactor is a tray for esterification, the second intermediate tray from above has a carboxylic acid inlet conduit and the inner spaces of these two intermediate trays are separated from the inner spaces of the other trays of the reactor by means of the liquid bell formed of the reaction mixture.

According to further characteristics of the invention, the inner spaces of the intermediate trays of the reactor are divided into two ring-shaped spaces by a space dividing element and by an overflow element passing to the next tray. The mixing element wedged to the main shaft is a double mixer the blades of which are developed so as to protrude into the single ring-shaped spaces, the reaction components maintained in turbulent stream in the ring-shaped space are let flow veil-like on the inner wall of the overflow element expediently as a curtain-like film of 0.5–1.5 cm thickness onto the next tray.

According to the further characteristics of the invention, a spray disc evaporating the reaction components flowing curtain-like from the former tray and forming bubbles with the gas introduced in the counterflow is wedged onto the main shaft above the mixing element.

According to further characteristics of the invention, the lower tray of the reactor is divided into at least two further ring-shaped spaces by means of space dividing elements, to which the conduit discharging the finished resin as well as a discharge conduit are connected, that is one of them is developed as a pressure equilizing liquid seal separating the inner space of the reactor from the outer atmosphere.

According to further characteristics of the invention, the trays of the reactor have sampling, discharging, washing and depolymerizing studs.

According to further characteristics of the invention, the main shaft is driven from a driving gear having a revolution speed controllable in a range of 20 to 500 r.p.m.

According to further characteristics of the invention the gas discharge pipe of the reactor is connected to the gas inlet stud of a solvent-water-gas separating apparatus comprised by a condenser, a separator and a liquid seal in which the reaction water is continuously discharged from the system through the separator, on the one hand, and the solvent is recycled by automatic replacement of loss and by control the reactor, on the other hand, whereas at the liquid seal the outgases are continuously discharged from the system.

The apparatus according to the invention ensures the fulfilment of the following:

The separation in space and the control of carrying out of different reaction types in the reactor;

In the given cross-sections of the reactor, the provision for the chosen optimum parameters corresponding to the reaction type;

In any given cross-section of the reactor, the continuous controllability and maintenance of the chosen values of the parameters;

The single controlled space units represent the same reaction zone but they can be adjusted to whatever reaction type in optionally chosen order corresponding to the synthetic resin types (polyadditive, polycondensation, polymerization and copolymerization reactions esterification, dehydration, reactions of Diels-Alder type etc.).

The temperature gradient between the single controlled stages can be optionally controlled as a function of the path length of the material flow;

The instrumental and chemical control, the intervention necessary in case of failure (possibility of discharge and depolymerization) are similarly ensured, independently for each stage;

The series-connected assembly beneath each other of the single stages reduces the specific power requirement within the reactor.

The development in this way of the reacting pile reduces the required production and dwelling time, respectively, since the transitions between the single reaction zones occur also without thermal loss.

The development of the reacting pile automatically eliminates the frequent obstructions usual with the intermittently operating apparatuses, which as a consequence of the poor thermal conduction of the synthetic resin melt, result in points of lower temperature or smaller cross-section.

In the common gas space developed between the stages, the gas-steam mixture advances in counterflow to the material stream of the reaction mixture;

The spray discs arranged over the mixer within the single stages, the dividing space elements and the overflow pipes for the next stage flow the material mixture overflowing in the liquid curtain on a forced trajectory.

The spray discs and the overflow pipes form — in the way described in the following points — drops and a curtain by means of the gas bubbled in counterflow. Thereby the specific surface of the reaction mixture, as the boundary surface of the various phases is considerably increased, in order to increase the reaction rate. Thereby the required reaction time and dwelling time, respectively, is reduced.

Within the single stages an intensive stirring is required for the reaction mixture of poor thermal conduction, in order to provide for the suitable heat transfer. The intensive stirring, together with the increase of the path length is of determining character for the dwelling time of the particles.

According to the above effects — taking the effective reaction time as a basis, reckoned from the production times usual in the intermittently operating apparatuses — the required reaction time is considerably reduced in the continuous reactor.

According to the above point, the average dwelling time of the particles shall be adjusted as a function of the quality of the end product in such a manner that the material flow and the output of the reacting pile, respectively, is increased up to the possible maximum by means of the feeding pump, corresponding to the type of the product.

The reactor is continuously maintained at the constant output value characterizing the product during the entire operation.

The average dwelling time of the particles can be thus regarded as constant — in case of identical product types — and it is in close connection with the yield of the reactor.

If no variation traceable in the flow rate is effected, the distribution function of the dwelling time can be defined according to both the entering and discharging flow.

In the practice, however, only the summary of the flow rates can be taken as constant, wherein the dwelling time of the particles displays a scattering.

When developing the flow conditions the perfect mixing shall be aimed at.

In the single stages the incorporated double mixing system together with the ring-shaped space dividing element arranged therein, further the use of the overflow ring system and the spray disc increase considerably the path length of the particles and cause a turbulent stream in the material flow moved on forced trajectory.

The turbulent stream eliminates the failure frequently occuring in the reactors of laminar stream, namely the formation of channels which causes the slipping-through of a significant part of the particles in a considerably shorter time than the average dwelling time.

In case of turbulent flow a possible irregularity occuring as another extreme is the remixing of the material from the product flow into the reactor space.

In order to avoid this latter, increased attention had to be paid to the choice of forced trajectory ensured by the development of space elements in case of the present construction. In case of reactions forming synthetic resins, this phenomenon would generate a fatal gelation in the reaction mixture.

It is evident from the above that the wide-range scattering of the dwelling time distribution or the discontinuity occurring on the distribution curve are dangerous to the quality of the end product, on the one hand, and cause breakdown, on the other hand.

The classical methods of measuring the dwelling time distribution cannot be applied with the increasing viscosity of the synthetic resin melt.

Therefore, on the basis of theoretical assumptions, a test model of 8-litre volume and then, a semi-plant test reactor of 100-litre volume were designed and built.

In compliance with the above, the dwelling time of the particles of the reaction mixture has been tested in the following way:

Measurements were taken, by varying the material flow, testing the samples of the single stages and the parameters of the end product, as a function of the yield of the reactor.

From the relationship between the conditions determining the reaction, the quality parameters and the output variations, conclusions were drawn as to the necessary development of space elements, in order to achieve the the optimum distribution of the dwelling time. These measurements served as the basis for the design of a plant reactor of 1000-litre volume.

In addition to the above measurements, more exactly appreciable results have been obtained by testing the mole weight distribution of the above samples.

In the case of macromolecular systems of synthetic resins the lengthy method of fractionation can be suitably substituted by the turbidity titration method. Dioxane is used as solvent and water as precipitant.

From the evaluation of the test results, the integral and differential curves of mole weight distribution of the single synthetic resin types as a function of the tray number can be determined, varying at the same time the material flow and the output, respectively.

According to the basic principle, the dwelling time is the same for the totality of particles of the reaction mixture in the intermittently operating apparatuses.

The intermittently produced synthetic resin optimalized according to the film properties of the end product displays also a continuous mole weight distribution of definite spectrum in its macromolecular structure.

The distribution of the intermittently produced products, however, indicates a compulsory fluctuation per charge as compared to the optimalized range, due to the inaccurate reproducibility outlined above.

In the course of the measurements carried out in the continuous reactor line, the evaluation of the defined integral and differential distribution curves justified the conclusion drawn from the practical measurements for the design of the next reactor size. It was proved, on the one hand, that in the material flow the curves of mole weight distributions were shifted to the right during the passage through the reactor, whereas the width of the distribution remained constant.

On the other hand, the macromolecular distribution curve rendered optimum during the intermittent procedure for each product type could be achieved continuously and could be maintained without fluctuation with a defined output value.

The further increase of the capacity would result in the displacement of the band of the distribution curve and in the falling off in the quality of the end product. The distribution band of continuously produced synthetic resin has the same orientation as the optimum intermittent curve but displays a more narrow bell curve than that representing a more homogeneous mole weight distribution.

It follows from the evaluation of the above that the space elements and mixing apparatuses of the reactor establish a turbulent material flow in which the dwelling time distribution of the particles can be characterized by a continuous curve having a narrow band in the vicinity of the value of the average dwelling time.

Plotting the dwelling time on the abscissa axis and the relative frequency of particles on the axis of ordinates, the curve does not show a sharp maximum, whereas the pertaining time interval is relatively wide. In addition to the output characterizing the products, the maximum value on the curve is higher with increasing feeding, whereas the pertaining time interval reduces and the mole weight distribution becomes heterogeneous.

In the reaction spaces inert gas is continuously let flow in counterflow. In the above reference was repeatedly made to its role in the development of flow conditions. The detailed introduction of its influence mechanism, however, can be made only after the survey of the main relationships.

The counterflow of the inert gas increases the boundary surface of the contacting phases. It promotes the removal of by-products on the increased surfaces in the case of a reaction leading to equilibrium.

Thereby the flow of inert gas increases the reaction rate (e.g. polycondensation) in case of some reaction types. With other reaction types, e.g. in polyadditive and polymerization reaction zones the conditions advantageous for the reaction are rendered optimum by the increase of the reaction surface and by the promotion of the heat transfer.

With the use of inert gas, secondary effects could be also reckoned upon.

The gas flow bubbled through the synthetic resin melt flowing curtain-like prevents the disadvantageous darkening of the product colour by precluding oxidation. When carrying out reactions having fire and explosion risk, the inert gas flow serves also for safety purposes, preventing or eliminating the eventual breakdown.

In an optionally chosen — but not in the last — stage of the reacting pile, expediently in the lower third of the pile and in the reaction zone of highest temperature, respectively, solvent is continuously introduced.

The vapours of the solvent flow in counterflow through the reaction mixture in the bottom part of the gas mixture formed with the inert gas flow.

The type of solvent can be optionally chosen aacording to the type of synthetic resin to be produced, corresponding to the sort of secondary product to be removed.

For the removal by azeotropic distillation of the secondary product (e.g. water) xylene is expediently used. In addition to the removal of secondary products, the vapours of solvent intensify the above influence mechanism of the inert gas flow.

Moreover, the solvent reduces the temperature and viscosity of the synthetic resin melt in the inlet zone by local effect. The vapours of the used solvent escape from the reacting pile in a counterflow together with the gas mixture, through the discharge conduit.

The said solvent do not remain in the discharging end product and their precipitate reenters the reacting pile in the cycle. Thus, the end product obtainable in solvent-free state can be unlimitedly used.

In order to achieve the above described effects, 5 percent of solvent is used, calculated upon the weight of the synthetic resin melt formed during the time unit.

Figure 2:
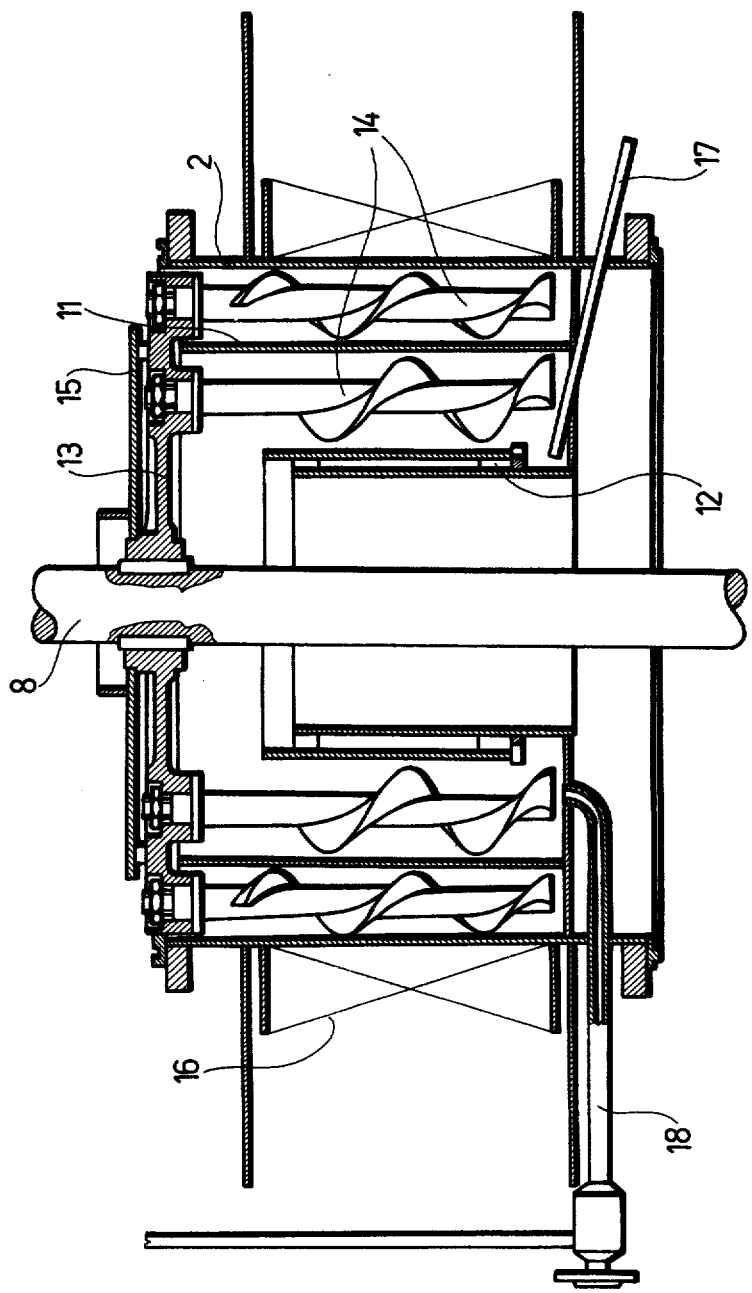
Figure 3:
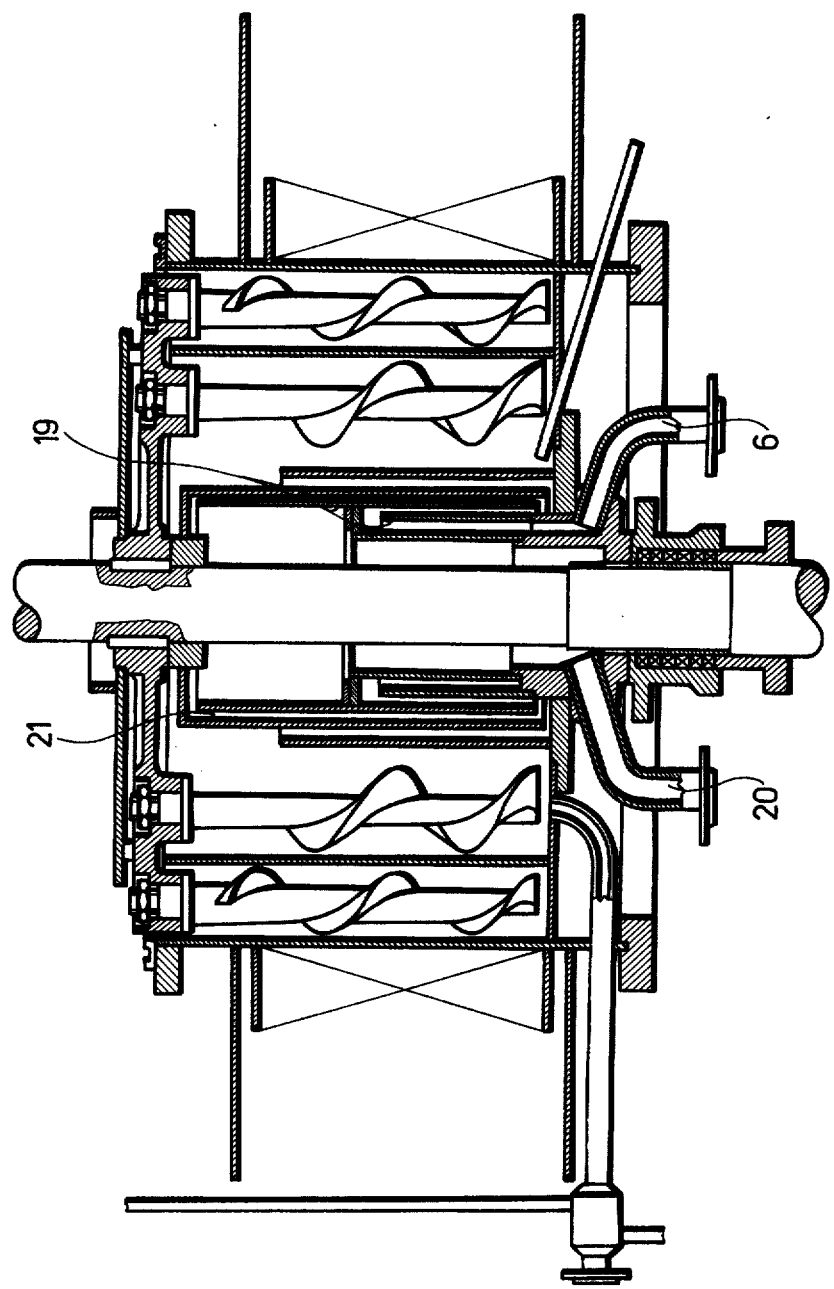
Figure 4:
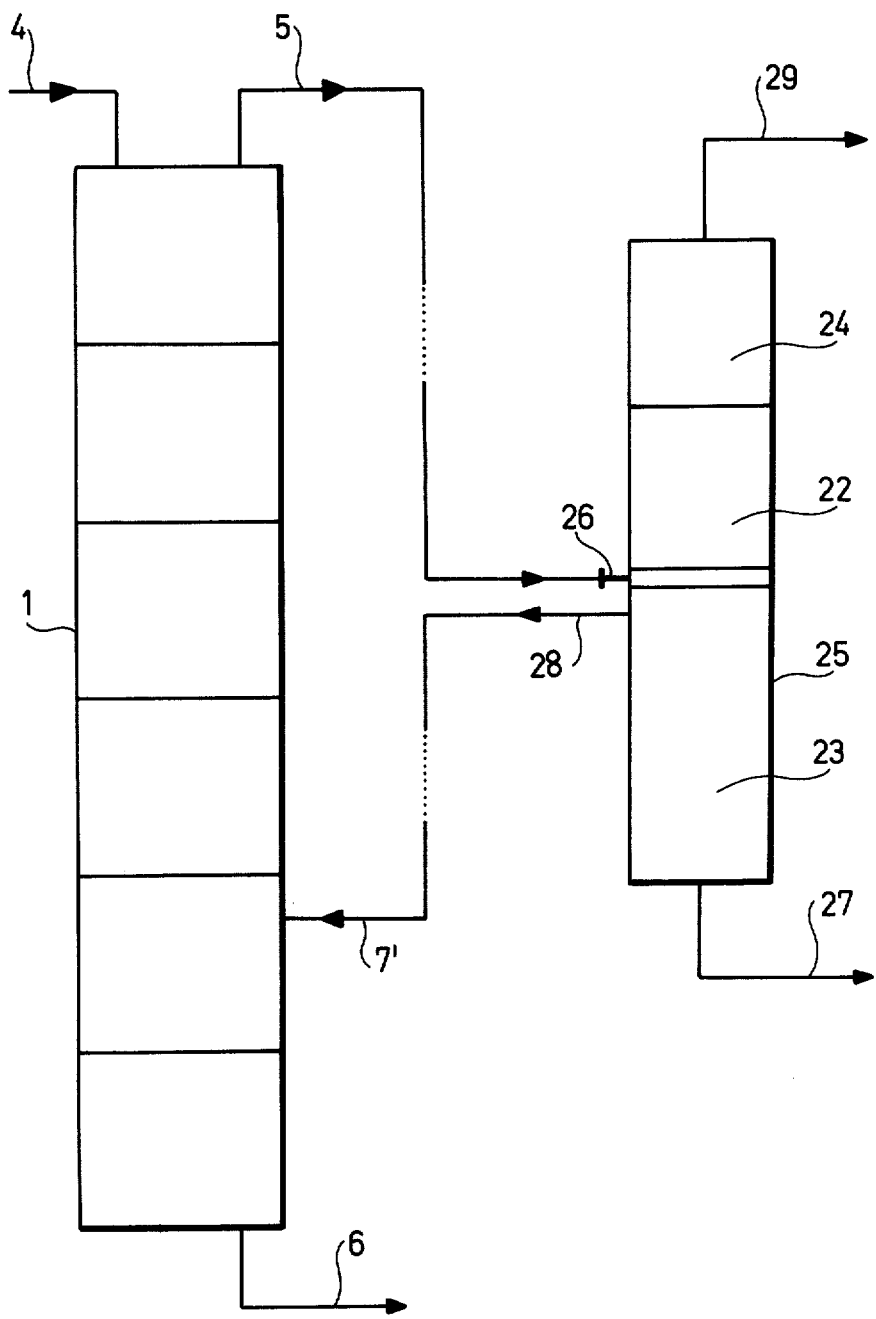

The equipment according to the invention will be described below more particularly in connection with the drawing, where FIG. 1 is the scheme of the reactor,
FIG. 2 shows the section of the intermediate tray,
FIG. 3 is the section of the lower tray,
FIG. 4 is the connection diagram of the equipment.

The construction of the reactor shown in FIG. 1 combines some characteristics of reactor types of the flowing film, of bubble phase and of mechanically stirred vessel. The advantages thereof were combined with entirely new structural solutions, taking into consideration the tendency to gelation and other special properties of synthetic resins for the varnish industry.

Consequently, the range of 0.1 – 1.5 mm film thicknesses formed in the film reactors was avoided. Instead of this, a liquid film of 0.1 – 1.5 cm thickness was developed by a gravitational runningover established by an overflow between the stages. In case of films, a film thickness in which the Reynolds number exceeds the critical value and indicates a turbulent stream, can be achieved only by suitable feeding speed.

The attentuation of films as a function of the change of the feeding, the temperature, the viscosity, the surface tension etc. results namely in the diminuation of the Reynolds number and in laminar flow, respectively. The relationships known in connection with films can be extrapolated to the used dimensional range.

The Reynolds number varies during the flow through the reactor even in case of one given product type.

In the course of the continuous production, the feeding can be taken as constant but the changes of temperature, the increase of the viscosity of the product and its effective value at a given temperature can influence the thickness of the liquid curtain and the Reynolds number characterizing the flow, in the length of the reacting pile.

With the used interval of the layer thickness, however, the turbulence can be maintained — corresponding to the set aim — with the control of the parameters carried out in case of whatever product type.

The mass flow increased by the feeding speed increases the layer thickness of the liquid, whereby the heat transfer coefficient is reduced. Thus, heat transfer conditions inferior to the films are to be expected in the case of layer thicknesses introduced by us.

The gas mixture lead in counterflow, however, bubbles through the synthetic resin curtain. It increases the specific surface area of that curtain by means of the developed bubble phase, like the conditions prevailing in the reactors of bubble phase, and the heat transfer coefficient improves to a value belonging to a lower layer thickness than the effective one.

The reactor 1 of the equipment according to the invention has "$n$" numbers of intermediate trays $2^1$, $2^2$, ...... $2^{n-1}$ communicating with each other, provided with heating and temperature regulating elements. The intermediate trays 2 are closed from beneath by a lower tray 3 developed as a recooling zone and hydraulic seal. The uppermost intermediate tray $2^1$ of the reactor 1 has a conduit 4 introducing the homogenized reaction components and a gas discharge pipe 5. The lower tray 3 has a conduit 6 discharging the finished resin. The intermediate tray $2^n$ has a gas inlet pipe 7.

The reactor 1 has a main shaft 8 developed along its total height and provided with mixing elements. The main shaft 8 is driven by a driving gear 9.

With a highly expedient embodiment of the reactor 1 of the equipment according to the invention the intermediate tray $2^1$ is a tray for esterification and the intermediate tray $2^2$ has an carboxylic acid inlet conduit 10.

The inner spaces of the intermediate trays 2 shown in FIG. 2 are divided into two ring-shaped spaces by a space dividing element 11 and by an overflow element 12 passing to the next tray. The mixing element wedged to the main shaft 8 is a double mixer 13, the blades 14 of which are developed so as to protrude into the single ring-shaped spaces.

A spray disc 15 is wedged onto the main shaft 8 above the mixing elements.

The development of the individual trays is partly similar to the stirred, continuously operating reactor of container type, the applied structural solution, however, provides for considerably more complex conditions.

The forced trajectory developed within the tray by the ring-shaped space dividing element 11 between the double mixers 13 and by the overflow 12 increases the path length and the dwelling time. At the same time, a high flow velocity can be provided for within the increased path length by the revolution speed of the mixer in order to intensify the reaction and the heat transfer.

Thus, the flow velocity of the particles can be adjusted to the multiple of the passing velocity through the trays (the latter can be considered identical to the yield of the reactor). This effect is increased with regard to a considerable part of the particles by the spray disc 15 located above the mixer, which under the effect of the centrifugal force forms drops and a curtain between the disc and the reaction space from the onflowing synthetic resin curtain, under the intensify effect of the gas counterflow.

In addition to those described above, the arrangement of the blades 14 ensures the turbulent flow in the liquid phase of the melt, for the purpose outlined above.

The intermediate trays 2 have heating bodies 16, measuring points 17 incorporating the elements of temperature regulator as well as sampling, discharging, washing and depolymerizating studs 18.

FIG. 3 shows the lower tray 3 of the reactor 1. The lower tray 3 is divided into two further ring-shaped spaces by means of the space dividing elements 19. To these spaces the conduit 6 discharging the finished resin and a discharge conduit 20 are connected.

In the lower tray 3 of the reactor 1 a hydraulic seal 21 for the reaction spaces is developed. Beyond the rings forming overflow of the intermediate trays 2 further space dividing elements are built in.

The end product is continuously conducted from a determinate ring-band, maintaining at the same time the hydraulic seal. The stud arranged at the lowest point of the hydraulic seal renders possible the complete discharge from time to time.

The central ring band is connected to the so-called emergency container through pipeline 20; this container serves at the same time for pressure compensation and is in communication only with the air space above the hydraulic seal 21 but has no direct contact with the reaction spaces.

The function of the last tray is — beyond the purpose described above — the exclusion of the oxygen of the air in the equipment as a hydraulic seal, for the elimination of the solvent loss, of the prevention of the pressure fluctuation of the equipment and for the continuous maintenance of nearly atmospheric pressure conditions.

This latter ensures the atmospheric discharge of the vapour of inert gas and solvent from the reactor space.

The sealing liquid is the synthetic resin melt itself. The liquid has to maintain the equilibrium with the pressure resulting from the tension of the solvent vapour and from the counterflow of the inert gas flow.

The applied heating method is of determining character for the conditions developing on the trays.

In case of induction heating the electric power changes over directly to Joule heat in the ferromagnetic field of the induction coils. In case of a heating of this type at least one heat transfer coefficient, namely that between the heating medium and the wall of the equipment is omitted.

The induction heating assembled independently per tray provides for the low value of temperature difference between the wall and the reaction space.

The value of 3 – 8°C of $\Delta t$ renders possible the reduction of colour number of synthetic resins and preventively excludes the unpleasant "calcine" on the reactor wall.

The particularity of the continuous system increases the utilization of the advantages of induction heating. The always identical heat requirement of whatever cross-section of the reactor increases the accuracy of the controllability and the thermal stability.

Each stage is provided separately with a heating regulating system. The instruments controlling the wall temperature are similarly built in per stages. The cylinder jackets of stages are made of iron plate metal plated with acid-resistant steel. The exciting coils are arranged on the jackets of the stages, enclosed air chambers providing for the ventillation and cooling.

Inlet and outlet air channels are connected to the air chambers.

In the former a catch for the adjustment of the air quantity, in the latter a sensing element measuring the air current and locking the entire heating system and feeding pump are built in.

The reacting pile is built up by connecting the cylindrical bodies constituting the stages with apparatus flanges; the sealing surfaces of the apparatus flanges are made of acid-resistant steel similar to the jacket side towards the reaction space.

The bearing supports of the shaft are located outside the reactor body, under and above the reactor, being built together with the driving gear in the lower position.

The revolution speed of the shaft can be chosen between 20 and 500 per min.

The trays arranged in the required number one under the other ensure the required average dwelling time due to their above described development even in case of high flow velocity, further they provide for the homogeneity of the time and mole weight distribution.

FIG. 4 shows the connection diagram of the equipment. The gas discharge pipe 5 of the reactor 1 of the equipment is connected to the steam inlet stud 26 of a solvent-water-gas separating apparatus 25 comprised by a condenser 22, a separator 23 and a liquid seal 24.

The equipment condenses the solvent and the water from the gas mixture in the water-cooled condenser 22. It separates the phases of the condensate, discharging the water 27 and continuously recycling the solvent 28.

The replacement of the solvent loss is ensured by automatic control.

The released outgases 29 are discharged from the equipment through a hydraulic seal by means of a vent conduit.

No "classical" reactor type can realize the above complex solution. According to the special requirements of the synthetic resin forming reactions, a turbulence is necessary, with high flow velocity and without recycling.

The fulfilment of the dwelling time demand, however, cannot result in relative increase of the tray dimensions. If the above requirement would be fulfilled by the relative dimensional increase of the stages, "calcines" could be found on the wall of the reaction space, similarly to autoclaves.

The number of trays is not critical. Within the single trays, the increased path length and dwelling time render possible the minimum tray number for carrying out the given reaction type.

The tray number can be varied in case of the same structural solution, which, however, involves necessarily changes of the dimensions of the main shaft.

The plant reactor built up and operated consists of $n = 6$ trays having a total useful volume of 1000 litres.

The flow rate is 200 – 350 kg/hour. The average dwelling time can be varied within wide limits (3 – 6 hours) by the suitable adjustment of the feeding speed corresponding to the product types.

The time requirement of the reactions of the synthetic resin production has been kept in view when selecting the tray number.

When building up a new reactor, the use of more or less than six trays is always possible.

Since with most of the synthetic resins of known types the polyadditive, polycondensation, polymerization reactions participate also together — subsequently or parallelly shifted — in the development of the macromolecular structure, the tray number of $n = 5$ was found to be the most advantageous in order to ensure the possible reaction zones of a general-purpose reactor for synthetic resin production.

Further on, the invention will be introduced more detailed by means of examples:

EXAMPLE 1

The tray 1 is the heating-up and polyadditive zone. Tray 2 may be a polyadditive or polycondenzation zone, whereas tray 3 a polycondenzation zone. Trays 4 and 5 can be controlled as polymerization reaction zones.

The $(n+1)$th, in the present case the sixth tray serves for the finishing and chilling, respectively, of the reaction, corresponding to the requirements of the type.

The division given above of the reaction zones is optional, the parameter values therein can be optionally determined and controlled.

The control adjusted in the sense of the present example is generally suitable for the production of most air-drying alkyd resins.

For the chosen air-drying ricinene or ricinene and other oil-modified alkyd type or large oil length (55 – 70%). The effective parameter adjustment can be as follows:

Feeding speed: 200 – 250 kg per hour

| Tray number of reactor | Temperature °C | Discharge time / sec, DIN-4, 20 °C (solvent of 50 % white spirit) | Acid number mg KOH/g (reckoned upon resin) | Colour number mgJ$_2$/100 ml (solvent of 50 % white spirit) |
|---|---|---|---|---|
| 1. | 190 | 45 | 45 | 20 |
| 2. | 225 | 37 | 33 | 20 |
| 3. | 255 | 48 | 24 | 20 |
| 4. | 262 | 70 | 19 | 20 |
| 5. | 260 | 118 | 14 | 21 |
| 6. | 245 | 148 | 11 | 21 |
| Intermittently operating equipment — end product —production time: 18 hours | | 150 | 15 | 30 |

EXAMPLE 2

For the production of a baking, undehydrated ricin or as well other oil modified alkyd type of short oil length (30 – 45%) the following control is suitable:

Feeding speed: 180 – 250 kg per hour

| Tray number of reactor | Temperature °C | Discharge time /sec, DIN-4, 20°C (solution containing 60 % of Xylene) | Acid number mg KOH/g (calculated for resin) | Colour number mgJ$_2$/100ml (solution containing 60 % of xylene) |
|---|---|---|---|---|
| 1. | 185 | 118 | 11.5 | 17 |
| 2. | 195 | 130 | 10.0 | 17 |
| 3. | 200 | 148 | 9.4 | 17 |
| 4. | 205 | 175 | 8.6 | 17 |
| 5. | 202 | 210 | 7.4 | 17 |
| 6. | 190 | 245 | 6.8 | 17 |
| End product of intermittently — operating equipment Production time: 22 hours | | 240 | 13.1 | 20 |

EXAMPLE 3

With the production of unsaturated polyester resin, the carrying out of an exothermic additive reaction starting at above about 60°C and the subsequent polycondenzation can be realized by the following parameter control:

Feeding speed: 250 – 300 kg per hour

| Tray number of reactor | Temperature °C | Discharge time, sec DIN-4, 20 °C, solution containing 60 % of styrene | Acid number mg KOH/g (calculated for resin/ | Colour number mgJ$_2$/100 ml solution containing 60 % of styrene) | Hydroxyl value mg KOH/g calculated for resin | Gelation time, min |
|---|---|---|---|---|---|---|
| 1. | 75–80 | 25 | 104 | 25 | 110 | 45 |
| 2. | 175–180 | 30 | 70 | 22 | 102 | 43 |
| 3. | 195–200 | 36 | 50 | 20 | 90 | 39 |
| 4. | 200–205 | 43 | 44 | 20 | 84 | 36 |
| 5. | 200–202 | 48 | 39 | 20 | 75 | 32 |
| 6. | 180–185 | 55 | 34 | 20 | 67 | 30 |

Feeding speed: 250 – 300 kg per hour – Continued

| Tray number of reactor | Temperature °C | Discharge time, sec DIN-4, 20 °C, solution containing 60 % of styrene | Acid number mg KOH/g (calculated for resin) | Colour number mgJ₂/100 ml solution containing 60 % of styrene) | Hydroxyl value mg KOH/g calculated for resin | Gelation time, min |
|---|---|---|---|---|---|---|
| End product of the intermittently operating equipment | — | 60 | 27 | 25 | 66 | 30 |

Production time: 15 hours

With other adjustment of the parameter the reduction of the acid number can be optionally influenced to the required value, e.g. to 50 – 60 mg KOH/g, according to the change of formula, as required.

The examples indicate the comparison of viscosity values of the continuously and intermittently produced end products; the feeding speed of inert gas and of xylene, respectively, was 15 – 30 cu.m. per hour and 10 – 100 kg per hour, respectively.

Finally a table is shown in order to compare the specific capacities of the continuously operating reactor and of the intermittently operating autoclave.

| Denomination Type | Specific capacity | | $\frac{\text{Cont. capacity}}{\text{Interm. capacity}} \times 100$ % |
|---|---|---|---|
| | Intermittent | Continuous | |
| | produced kg per useful volume in litres . hours | | |
| According to | | | |
| Example 1 | 0.050 | 0.200 | 400 |
| Example 2 | 0.040 | 0.200 | 500 |
| Example 3 | 0.060 | 0.300 | 500 |

The data given in the table represent the values measured in the course of plant production.

It should be noted that in addition to the introduced alkyd resin and polyester resin types, also other types of alkyd, acrylate and other copolymers, heat polymerized oils, hard resins of Albertol and maleinate types have been successfully produced.

From the continuously produced synthetic resin the suitable type of paint and enamel, respectively has been obtained. The film properties of the enamel layer were compared with those of the paint manufactured on the base of the intermittently manufactured product. The quality of the product manufactured continuously certainly reached, moreover exceeded that of the intermittently obtained product.

Although the above examples do not introduce the entire range of synthetic resins for the varnish industry, the possible tendency of temperature changes (up to 300° C), however, means the free choice of the reaction zones in case of any synthetic resin type, applying the suitable parameters and providing for the characteristic output. The periodically taken samples per tray show the progression of the reaction in question in the zones (e.g. acid number, colour number, iodine number, hydroxyl value, viscosity, melting point, mole weight distribution curves etc.).

On the basis of tests characterizing each reaction type the optimum values regulable at each tray of the single parameters can be determined.

The manipulation of the reactor is extremely simple and not labour-consuming at all. It is obvious from the above examples that in addition to the temperature regulation also the feeding speed corresponding to the given type shall be adjusted. These regulations will provide for the optimum conditions in the reaction spaces of the elaborated construction for the production of the given synthetic resin type. The above regulation can be further influenced by the adjustment per product type of the inert gas and solvent feeding.

For the changeover from one product to the other a washing device manageable at each tray is provided for which washes the surfaces of metal clean without the disassembly of the apparatus in a few hours. The discharging apparatus practically eliminates the eventual material loss.

The acid number, the hydroxyl value, colour number and iodine number of the synthetic resins decrease, while their viscosity, their polycondensation and polymerization degree generally increase — corresponding of course to the product type — as a function of the tray number. In case of unsaturated polyesters, for instance, also the gelatin time decreases as a fuction of the tray number.

With the progression of the reactions, the mole weight distribution curves are gradually shifted to the right, without a considerable change of the distribution width. The distribution width indicates a more homogeneous mole weight distribution as compared to the intermittent process.

The distribution and quality parameters characterizing the product type can be accurately reproduced in the continuously operating equipment.

The specific capacity of the continuously operating reactor varies between a 2 – 4.5-times value as a function of the product type, as compared to the intermittently operating autoclaves.

The production processes take place in the constructed reactor and in the solvent-water-gas separator, as well as in the solvent feeder. The raw material feeding process and the synthetic resin solving process are connected to the production reactor in a semicontinuous or fully automatized manner. The semicontinuous feeding of the raw material from the homogenized stoichiometrical mixture is ensured by a pump of variable but regulable revolution speed, maintaining the chosen output at a constant value.

The synthetic resin is dissolved in two alternately coupled water-cooled dissolving vats equipped with mixer to the required concentration in the chosen solvent.

For the full automatization of the feeding of raw material a multi-stage pump of a capacity to be programmed shall be assembled to the reactor.

The dissolving process can be automatized by building in a stirred, continuously operating container reactor provided with instruments for measuring the solvent and the solution quantity.

What we claim is:

1. Equipment for the continuous production of synthetic resins, comprising an upright fixed cylindrical reactor having a plurality of superposed trays therein, means for heating said trays, a central vertical shaft extending through said trays within said reactor, means for rotating said shaft, mixing elements on said shaft for stirring the material on said trays, each tray having an upstanding cylindrical dividing element thereon, an outer wall radially outwardly of said dividing element and extending from each said tray to a height greater than the height of said dividing element, and radially inwardly of said dividing element an upstanding overflow element of a height less than said dividing element, a spray disc over the mixing element of each tray for directing material to the radially outer side of said dividing element and to the radially inner side of said outer wall so that material flows from the outer side of said dividing element over said dividing element to the inner side of said dividing element and then over said overflow element to the tray below, means for introducing reaction material into the top of the reactor, means for removing synthetic resins from the bottom of the reactor, means for introducing gas into the reactor below at least some of the trays of the reactor, and means for removing gas from the top of the reactor.

2. Equipment as claimed in claim 1, said mixing element comprising a member extending radially outwardly from said shaft over said dividing element and having stirrers that extend downwardly on either side of said dividing element.

3. Equipment as claimed in claim 1, and a further overflow element radially inwardly of the first mentioned overflow element on the lowermost of said trays.

4. Equipment as claimed in claim 1, and condenser means to which said gas from the top of the reactor is fed, means for removing water from the bottom of said condenser means and for removing uncondensed gases from the top of said condenser means, and means for returning to said reactor material separated in said condenser that is less dense than water.

* * * * *